United States Patent [19]

Takahashi et al.

[11] 4,183,840

[45] Jan. 15, 1980

[54] POLY(PHENYLENE SULFIDE) RESIN COATING COMPOSITION

[75] Inventors: Minoru Takahashi, Uji; Osamu Ishii, Takatsuki; Masanori Naito; Yoshinobu Kusuhara, both of Osaka; Naofumi Imahigshi, Takatsuki, all of Japan

[73] Assignee: Sekisui Kagaku Kogyo Kabushiki Kaisha, Osaka, Japan

[21] Appl. No.: 870,999

[22] Filed: Jan. 20, 1978

[30] Foreign Application Priority Data

Jan. 21, 1977 [JP] Japan .................................. 52-6003

[51] Int. Cl.² ............................................. C08K 3/22
[52] U.S. Cl. .................................... 260/37 R; 427/195
[58] Field of Search ...................... 260/37 R; 427/195

[56] References Cited

U.S. PATENT DOCUMENTS

| | | | |
|---|---|---|---|
| 3,562,199 | 2/1971 | Hill et al. | 260/37 R |
| 3,622,376 | 11/1971 | Tieszen et al. | 260/37 R X |
| 3,725,362 | 4/1973 | Walker | 260/37 R |
| 4,012,539 | 3/1977 | Davies | 427/195 |
| 4,086,376 | 4/1978 | Davies | 427/195 X |

FOREIGN PATENT DOCUMENTS 50-71725  6/1975  Japan .

*Primary Examiner*—Sandra M. Person
*Attorney, Agent, or Firm*—Wenderoth, Lind & Ponack

[57] ABSTRACT

A composition comprising a poly(phenylene sulfide) resin powder and an aluminum oxide powder of colloidal size. The composition is useful as a powder coating composition. The composition exhibits improved adhesion to a substrate, even in hot water.

5 Claims, No Drawings

POLY(PHENYLENE SULFIDE) RESIN COATING COMPOSITION

This invention relates to a composition comprising a mixture of a poly(phenylene sulfide) resin powder and an aluminum oxide powder, and more specifically, to a powder coating composition comprising a poly(phenylene sulfide) resin powder and an aluminum oxide powder of colloidal size.

Poly(phenylene sulfide) resin has recently been much studied for its capacity of forming coated films having good thermal stability, chemical resistance and mechanical properties. Coated films of the poly(phenylene sulfide) resin are generally considered to have better adhesion to substrates than those of other resins. In practical application, however, their adhesion is not sufficient, and particularly in hot water, tends to decrease markedly.

A general method known to improve the adhesion of resinous coated films involves blending or graft-copolymerizing a compound having a polar group such as an epoxy resin or acrylic acid with a resin. Since a paint film of the poly(phenylene sulfide) resin requires high temperatures and long periods of time for baking, when a paint of the poly(phenylene sulfide) modified by this method is used, the polar organic compound blended or grafted with it will decompose during baking at high temperatures. It is extremely difficult therefore to improve the adhesion of the poly(phenylene sulfide) by this general method.

It is an object of this invention therefore to provide a poly(phenylene sulfide) resin composition comprising a powdery poly(phenylene sulfide) resin and an aluminum oxide powder of colloidal size, which gives coated films having superior adhesion even in hot water.

The poly(phenylene sulfide) is a resin whose main chain is composed mainly of the recurring unit

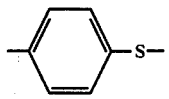

in which the phenylene group is optionally substituted by halogen or an alkyl group with 1 to 12 carbon atoms. The resin may have a partially oxidized, branched or cross-linked structure. The poly(phenylene sulfide) resin and a method for its production are disclosed, for example, in U.S. Pat. No. 3,354,129. To be suitable as a paint, the resin generally has a melting point of 200° to 350° C., preferably 250° to 300° C., and a melt flow (ASTM D1238, under a load of 5 kg at 600° F.) of 30 to 6,000 g/10 minutes, preferably 100 to 3,000 g/10 minutes. The particle diameter of the resin powder is not particularly limited, and may be the one convenient for spray coating, for example, 1 to 150μ, preferably 10 to 100μ. The poly(phenylene sulfide) powder is commercially available, for example under the designation RYTON PPS (a trademark for a product of Phillips Petroleum Co., U.S.A.). In the present invention, such a commercially available product can be used.

The colloidal aluminum oxide used in this invention has a primary particle diameter of less than 100 mμ. The primary particles denote individual particles which basically constitute the powder, and do not mean secondary particles which are formed by the aggregation of the individual primary particles. There is no problem even if the secondary particles have a diameter of more than 100 mμ.

If the particle diameter of the primary particles of aluminum oxide exceeds 100 mμ, the powder coating composition has decreased flowability at the time of coating, and gives coatings of reduced smoothness. Hence, pinholes tend to occur in the coated films.

The amount of the aluminum oxide powder is 0.05 to 10 parts by weight, preferably 0.3 to 5 parts by weight, per 100 parts by weight of the poly(phenylene sulfide) resin. If the amount is smaller than the lower limit, the effect of the present invention is difficult to expect, and if it exceeds the upper limit, the smoothness of the resulting coated film tends to decrease.

The composition of this invention can be produced by mixing the poly(phenylene sulfide) powder and the aluminum oxide powder by a suitable mixing means such as a supermixer.

The composition of this invention is especially suitable as a paint to be applied by the powder coating method, which is called a powder paint. Generally, paints containing a certain resin to be coated on a substrate are classified into a solvent-soluble paint in which the resin is dissolved in a solvent, a dispersion paint in which the resin is dispersed in a liquid medium to form a slurry, and a powder paint in which the resin is in the form of a powder. The poly(phenylene sulfide) paint has been applied usually as a dispersion paint. The composition of this invention, however, can be easily applied as a powder paint, and very good results can be obtained. The powder coating method includes spray coating, fluidized bed coating, electrostatic powder coating and plasma spray coating. The composition of this invention can be applied by any of these specific methods. Known poly(phenylene sulfide) resin (PPS for short) compositions properly used in the form of a slurry in water or another liquid medium are disclosed, for example, in U.S. Pat. No. 3,776,880 (PPS+selected nitrogeneous organic compounds such as melamine), Japanese Patent Publication No. 38689/74 (PPS+TiO₂) and Japanese Laid-Open Patent Publication No. 71725/75 (PPS+fluorocarbon resin+TiO₂).

The powder paint has the following advantages over dispersion paints.

(a) In the case of the powder paint, a thick coating can be formed by one cycle of coating operation. In the case of the dispersion paint, a thick coating cannot be formed by one coating operation, and the coating must be carried out a number of times until the desired thickness is obtained. Hence, the dispersion paint has poor operability.

(b) When the dispersion paint is used, pinholes tend to form in the coated film by the volatilization of the liquid medium. These pinholes cause deterioration of the properties of the coated film, especially hot water resistance. The occurrence of pinholes could be prevented by carefully controlling the speed of drying. In practice, however, it is difficult to exercise good control all the time. The powder paint, on the other hand, can give superior coated films without involving such a defect or difficulty.

(c) When the dispersion paint is used to coat the inner surface of a tubular product, especially a narrow pipe, a coating of uniform thickness is considerably difficult to obtain because the slurry flows. In contrast, when the powder paint is used, a coating of uniform thickness can be easily obtained in such a case.

One example of the application of the poly(phenylene sulfide) composition of this invention as a powder paint by spray coating is described below.

The composition is applied to the desired thickness to the surface of a substrate by an ordinary spraying means such as a spray gun, and then baked at a temperature of about 300° C. to about 450° C. for a suitable period of time to cure the coating. Thus, a coated film can be simply obtained which has good thermal stability, chemical resistance and mechanical properties and superior adhesion, especially in hot water.

Prior to the application of the composition of this invention, a suitable primer may be applied to the surface to be coated, and this is a preferred procedure. Preferably, the primer is a usual primer composition containing aluminum powder, for example an aluminum phosphate-type primer containing 50% by weight of aluminum powder. As especially preferred primer is disclosed by the present inventors in U.S. patent application Ser. No. 825,855 filed Aug. 18, 1977. This primer coating composition comprises a mixture of more than 50% by weight of aluminum powder and less than 50% by weight of zinc powder, and at least one $C_{1-4}$-alkyl silicate soluble in organic solvents.

Substrates to be coated with the composition of this invention include thermally stable materials such as metal, glass, ceramics and stone. Preferably, metals such as iron, copper, aluminum, titanium and chromium or metal alloys such as steel are used.

Specific objects to be coated in accordance with this invention are the inner surfaces of pipes, pipe fittings or valves made of steel, cast iron or stainless steel. These pipes and other articles are useful as water-supplying lines, especially hot water supplying lines.

The following Examples and Comparative Examples illustrate the fact that by using the composition of this invention, a thick coated film can be formed on the surface of a substrate by one cycle of powder coating operation, and the resulting coated film has superior adhesion to the substrate which is not reduced in hot water.

EXAMPLES 1 to 3 AND COMPARATIVE EXAMPLES 1 and 2

Poly(phenylene sulfide) resin composition as a powder paint:

The ingredients shown in Table 1 were fully mixed to prepare compositions in these examples. The numerical figures in the table refer to parts by weight.

Table 1

| Ingredients | Examples | | | Comparative Examples | |
|---|---|---|---|---|---|
| | 1 | 2 | 3 | 1 | 2 |
| Poly(phosphenylene sulfide) resin powder | 100 | 100 | 100 | 100 | 100 |
| Aluminum oxide powder | 0.5 | 1.0 | 5.0 | — | — |
| Fine silica powder | — | — | — | — | 1 |

The poly(phenylene sulfide) resin was RYTON-PPS P2 (a trademark for a product of Phillips Petroleum Co,); the aluminum oxide was a fine powder with an average primary particle diameter of 20 m$\mu$ (AEROSIL-C, a trademark for a product of Nippon Aerosil Company); and the silica was a fine powder having an average primary particle diameter of 7 m$\mu$ (AEROSIL#380, a trademark for a product of Nippon Aerosil Company).

Powder coating:

An aluminum phosphate-type primer containing 50% by weight of aluminum powder was coated on a steel panel degreased with trichloroethylene, and baked at 400° C. to form a primer layer having a thickness of about 20$\mu$. Each of the compositions shown in Table 1 was sprayed onto the primer layer by a spray gun, and then baked at 380° C. for 60 minutes to form a coating having a thickness of about 200$\mu$. The properties of the coated steel panel samples obtained were evaluated, and the results are shown in Table 2.

Table 2

| Test items | Cross hatch test | | Crosscut test | |
|---|---|---|---|---|
| | Untreated | After hot water treatment | Before hot water treatment | After hot water treatment |
| Example 1 | No change | No change | No change | No change |
| 2 | " | " | " | " |
| 3 | " | " | " | " |
| Comparative Example 1 | Partly peeled | Entirely peeled | Peeled near the cut line | Entirely peeled |
| 2 | " | Almost entirely peeled | No change | Almost entirely peeled |

The cross hatch test was performed by providing cuts on the coating lengthwise and crosswise at intervals of 2 mm, and observing the peeled state. The specimens were either untreated, or dipped for 24 hours in hot water at 110° C.

The crosscut test was performed by providing a crosscut in an untreated specimen so that two lines each measuring about 70 mm in length crossed at an angle of about 45° at the center of the specimen, observing the peeled state, then, dipping the specimen for 24 hours in hot water at 110° C., and observing the peeled state of the specimen after dipping.

COMPARATIVE EXAMPLE 3

Dispersion paint:

The following ingredients were fully mixed in a ball mill to form a dispersion paint. The parts are by weight.

| | |
|---|---|
| Poly(phenylene sulfide) resin powder (RYTON PPS V-1, a trademark for a product of Phillips Petroleum CO.) | 100 parts |
| Titanium oxide powder (Tipaque-R930, a product having a particle diameter of 0.25 to 0.4 $\mu$, Ishihara Sangyo K.K.) | 33 parts |
| Surface active agent (Noigen EA 141, a trademark for a product of Daiichi Kogyo Seiyaku K.K.) | 3 parts |
| Water | 300 parts |

Dispersion coating:

The same primer as used in the above Examples was coated on a steel panel degreased with trichloroethylene, and baked at 350° C. to produce a primer layer having a thickness of about 20$\mu$.

The slurry-like dispersion paint was sprayed onto the surface of the primer layer, dried, and baked at 330° C. for 15 minutes. This operation was repeated seven times. Finally, the coating was further baked at 375° C. for 45 minutes to form a coating having a thickness of about 150$\mu$. The cross hatch test and crosscut test were performed on the resulting coated steel panel specimen. The results are shown in Table 3.

Table 3

| Cross hatch test | | Crosscut test | |
| --- | --- | --- | --- |
| Untreated | After hot water treatment | Untreated | After hot water treatment |
| Partly peeled | Entirely peeled | Peeled near the cut line | Entirely peeled |

What is claimed is:

1. A poly(phenylene sulfide)resin coating composition comprising 100 parts by weight of a poly(phenylene sulfide) resin powder and 0.05 to 10 parts by weight of an aluminum oxide powder of colloidal size.

2. The composition of claim 1 in which the aluminum oxide powder has a particle diameter of less than 100 m$\mu$.

3. The composition of claim 1 wherein the amount of the aluminum oxide powder is 0.3 to 5 parts by weight per 100 parts by weight of the poly(phenylene sulfide) resin powder.

4. The composition of claim 1 as a powder coating composition.

5. The composition of claim 2 in which the poly(phenylene sulfide) resin powder has a particle diameter of 1 to 150$\mu$.

* * * * *